(12) United States Patent
Liu et al.

(10) Patent No.: US 12,325,649 B2
(45) Date of Patent: Jun. 10, 2025

(54) MICROORGANISM GENERATION SYSTEM FOR SLUDGE-FREE AEROBIC TANK AND MANUFACTURE METHOD THEREFOR

(71) Applicant: North China University of Water Resources and Electric Power, Henan (CN)

(72) Inventors: Junguo Liu, Henan (CN); Shoukai Chen, Henan (CN); Zhongkun He, Henan (CN); Shanshan Tang, Henan (CN)

(73) Assignee: North China University of Water Resources and Electric Power, Zhengzhou (CN)

( * ) Notice: Subject to any disclaimer, the term of this patent is extended or adjusted under 35 U.S.C. 154(b) by 0 days.

(21) Appl. No.: 18/799,952

(22) Filed: Aug. 9, 2024

(65) Prior Publication Data

US 2025/0083982 A1 Mar. 13, 2025

(51) Int. Cl.
*C02F 3/10* (2023.01)
*C02F 101/10* (2006.01)
*C02F 101/16* (2006.01)

(52) U.S. Cl.
CPC .......... *C02F 3/10* (2013.01); *C02F 2101/105* (2013.01); *C02F 2101/16* (2013.01); *C02F 2203/006* (2013.01)

(58) Field of Classification Search
CPC .. C02F 3/10; C02F 2101/105; C02F 2101/16; C02F 2203/006
USPC .......................................................... 210/600
See application file for complete search history.

(56) References Cited

U.S. PATENT DOCUMENTS

2021/0070640 A1 3/2021 Yaman et al.

FOREIGN PATENT DOCUMENTS

| CN | 114524525 A | * | 5/2022 | ................ C02F 3/34 |
| KR | 20130036859 A | | 4/2013 | |
| WO | 2018205566 A1 | | 11/2018 | |

OTHER PUBLICATIONS

Espacenet Translation of Ma Limin (Year: 2022).*
Espacenet Translation of Ha Sang Bae (Year: 2013).*

* cited by examiner

*Primary Examiner* — Ekandra S. Miller-Cruz

(57) ABSTRACT

Disclosed are a microorganism generation system for a sludge-free aerobic tank and a manufacture method therefor. The system includes a square mold, a water-permeable and anti-filtered geotextile, a bonding module and mixed fillers. The water-permeable and anti-filtered geotextile is fixed to an inner wall of the mold in a matching manner, the bonding module serves to bond the water-permeable and anti-filtered geotextile to the mixed fillers, and the mixed fillers are loaded into an inner cavity of the mold in layers through a seam at a top of the water-permeable and anti-filtered geotextile. In the present disclosure, microorganisms can be generated automatically in the event of sewage and aeration, requiring neither activated sludge nor supplementation of carbon sources, and the present invention can be used for the treatment of sewage into rivers (lakes) or the bypass treatment of polluted water in rivers and lakes and the restoration of water ecology.

7 Claims, 5 Drawing Sheets

MICROORGANISM GENERATION SYSTEM FOR SLUDGE-FREE AEROBIC TANK AND MANUFACTURE METHOD THEREFOR

CROSS-REFERENCE TO RELATED APPLICATIONS

This application claims priority of Chinese Patent Application No. 202311179570.7, filed on Sep. 13, 2023, the entire contents of which are incorporated herein by reference.

TECHNICAL FIELD

The present disclosure belongs to the technical field of ecological restoration, and specifically relates to a microorganism generation system for a sludge-free aerobic tank and a manufacture method therefor.

BACKGROUND

In recent years, all cities are risking various water pollution problems and suffering deterioration of water ecological environment, so there is an urgent need for water ecology restoration and urban sewage treatment. Accordingly, it is an indispensable measure to protect the urban water environment by discharging the polluted water or domestic sewage, after being effectively and directly treated to meet the discharge standard, into the natural water.

Currently, as one of the most extensively applied methods by aerobic biological treatment of sewage, activated sludge process is primarily employed to treat or purify the existing polluted water. Activated sludge, formed by microbial populations such as bacteria, fungi, protozoa and metazoa mixed with suspended and colloidal substances in sewage, has strong adsorption and decomposition of organic matter and possesses flocculated sludge granules with good settling performance and biochemical activity, and can remove part of the phosphorus and nitrogen. Out of a hundred years of the development of activated sludge process come various process types, including conventional activated sludge process, completely mixed activated sludge process, adsorption-regeneration activated sludge process, adsorption-biodegradation process, oxidation ditch process, sequencing batch reactor activated sludge (SBR) process, and the process deformed from the SBR process (including cyclic activated sludge system (CASS) process, intermittently decanted extended aeration (IDEA) process, modified sequencing batch reactor (MSBR) process, etc.), porous suspension carrier activated sludge process, and membrane bioreactor process.

In the aforementioned conventional activated sludge process, aerobic tanks have diverse microbial populations with low density, resulting in the aerobic tanks covering a large area, having a high operating cost, poor shock-resistant load capacity, a large sludge volume, and the need to add with carbon sources. In addition, it is difficult to meet the standard requirements for total phosphorus and total nitrogen in the treatment of low-pollution sewage by the conventional biological methods.

SUMMARY

In response to the deficiencies and problems that, in the existing activated sludge process, aerobic tanks have diverse microbial populations with low density, resulting in the aerobic tanks covering a large area, having a high operating cost, poor shock-resistant load capacity, a large sludge volume, and the need to add with carbon sources, and it is difficult to meet the standard requirements for total phosphorus and total nitrogen in the treatment of low-pollution sewage by the conventional biological methods, the present disclosure provides a microorganism generation system for a sludge-free aerobic tank and a manufacture method therefor.

The solution employed by the present disclosure to solve the technical problems is as follows. A microorganism generation system for a sludge-free aerobic tank includes a square mold, the mold being transparent, and further includes a water-permeable and anti-filtered geotextile, a bonding module and mixed fillers. The water-permeable and anti-filtered geotextile is fixed to an inner wall of the mold in a matching manner, and bonded and fixed to the bonding module; the mixed fillers are loaded into an inner cavity of the mold in layers through a scam at a top of the water-permeable and anti-filtered geotextile; the bonding module serves to bond the water-permeable and anti-filtered geotextile to the mixed fillers; and semicircular humps are arranged at a bottom of the mold in intersecting parallels, and semicircular vent pipes for providing aeration are sleeved in a matching manner inside inner cavities of the semicircular humps arranged in intersecting parallels.

Further, the bonding module is a polyethersulfone (PES) hot melt adhesive mesh film; scale lines are arranged around the inner wall of the mold; and vent holes are disposed at equal intervals on the vent pipes.

Further, the mixed fillers include carrier microorganisms and zeolite, the zeolite being granular zeolite with a diameter of 6-10 mm, and the two are mixed in a mass ratio of 1:600-1000; and the mixed fillers of the carrier microorganisms and the zeolite have a loading density of not less than 2.0 $g/cm^3$ and a void ratio of not less than 35%.

Further, the carrier microorganisms are immobilized carriers containing high density of nitrifying bacteria communities.

Further, the water-permeable and anti-filtered geotextile has a lap width of not less than 0.2 m, a thickness of 5-6 mm, and a tensile strength of more than 15 kN/m.

The present disclosure further provides a manufacture method for a microorganism generation system for a sludge-free aerobic tank, including the following steps:

S1, material preparation: preparing immobilized carriers containing high density of nitrifying bacteria communities, zeolite, a PES hot melt adhesive mesh film, and a water-permeable and anti-filtered geotextile;

S2, manufacturing a special mold and special semicircular vent pipes, and sleeving the vent pipes to bumped cavities arranged in intersecting parallels at a bottom of the mold in a matching manner; and uniformly mixing immobilized carrier microorganisms and granular zeolite in proportion;

S3, fixing the water-permeable and anti-filtered geotextile, after being attached to the PES hot melt adhesive mesh film, to an inner wall of the mold;

S4, loading the mixed fillers into the mold in layers while vibrating with a vibration table, to ensure that the filling is dense, leveling an upper part after the mold is filled with the mixed fillers, and seaming tightly the water-permeable and anti-filtered geotextile on the upper part after the results of physical test are in line with the requirements; and S5, placing the mold densely filled with the mixed fillers into a drying oven for roasting before being cooled to room temperature, and removing the mold to obtain a microorganism generation system.

Further, in step S5, when a temperature of the drying oven is increased to 120° C.-160° C., the mold is immediately taken out for cooling after being roasted for 8-12 s.

Further, the physical test includes a loading density and a void ratio, and the loading density is required to be not less than 2.0 g/cm$^3$, and the void ratio to be not less than 35%.

Compared with the prior art, the present disclosure has the following beneficial effects.

According to the microorganism generation system for a sludge-free aerobic tank and a manufacture method therefor provided by the present disclosure, the immobilized carriers containing nitrifying bacteria communities are mixed with the filter material of zeolite, and the water-permeable and anti-filtered geotextile is bonded to the PES hot melt adhesive mesh film to form a whole, which is simple in process, and time-saving and energy-saving. The microorganisms can be automatically generated in the event of sewage and aeration, requiring neither activated sludge nor supplementation of carbon sources, which is in line with the energy-saving environmental protection standards. The deficiencies that in the conventional activated sludge process, the aerobic tanks cover a large area, and have a high operating cost, poor shock-resistant load capacity, a large sludge volume, and the need to add with carbon sources are eliminated, with a better effect of sewage treatment and a high effluent standard.

In the present disclosure, the microorganism generation system is modularized, which can be designed as required, is flexible in assembly and easy in construction, and can be adjusted and replaced in time according to the scale of sewage treatment, good for management. It is convenient to be used for the rapid treatment of polluted water, and has the advantages of small area coverage, low cost, and high treatment efficiency. Moreover, in the present disclosure, the integration and modularity are combined, allowing the microorganism generation system in the aerobic tank to ceaselessly release single microorganisms of nitrifying bacteria communities, without demanding of activated sludge and adding with carbon sources, thereby greatly improving the sewage treatment efficiency of the aerobic tank.

In the present disclosure, the wrapping design of the water-permeable and anti-filtered geotextile, the PES hot melt adhesive mesh film and the semicircular vent pipes not only realizes the functions of aeration, drainage and microorganism release in the microorganism generation system, but also serves for protection, anti-filtration and heat preservation.

In the present disclosure, the drawback in the conventional activated sludge process where the composition of microorganisms cannot be artificially selected is avoided, and it is ensured that the microorganisms in water are completely optimized and screened for specific microorganism combinations, which greatly improves the sewage treatment efficiency. At the same time, in the present disclosure, a large number (400-500 species) of stray bacteria are avoided in the conventional activated sludge process, which have no treatment effect in the process of sewage treatment, consume a large amount of oxygen and electricity, and produce a large amount of sludge and odor after death, thus forming a secondary pollution.

In the present disclosure, the protected "parent bodies" of the immobilized carrier microorganisms can reproduce in suitable sewage, with a high density of microorganisms, so even if they are impacted by toxic substances, they can restore to normal in a short period of time, thus avoiding the phenomenon that microorganisms in the activated sludge process die in the biochemical tanks due to the impact from toxic substances.

Moreover, the present disclosure is low in cost, without demanding of carbon sources and producing sludge in the sewage treatment process, which saves the cost on sludge transportation and treatment and the cost for the addition of carbon sources, and thus saves operating costs. In addition, the carrier microorganisms of the present disclosure have a high density and single function, which can effectively reduce the volume of the aerobic tank, allowing the aerobic tank to have strong shock-resistant loading capacity. It has been tested that the generation system of the present disclosure can significantly improve the sewage treatment efficiency, and has better treatment effect on chemical oxygen demand (COD), total nitrogen and total phosphorus in sewage.

Figure 1:
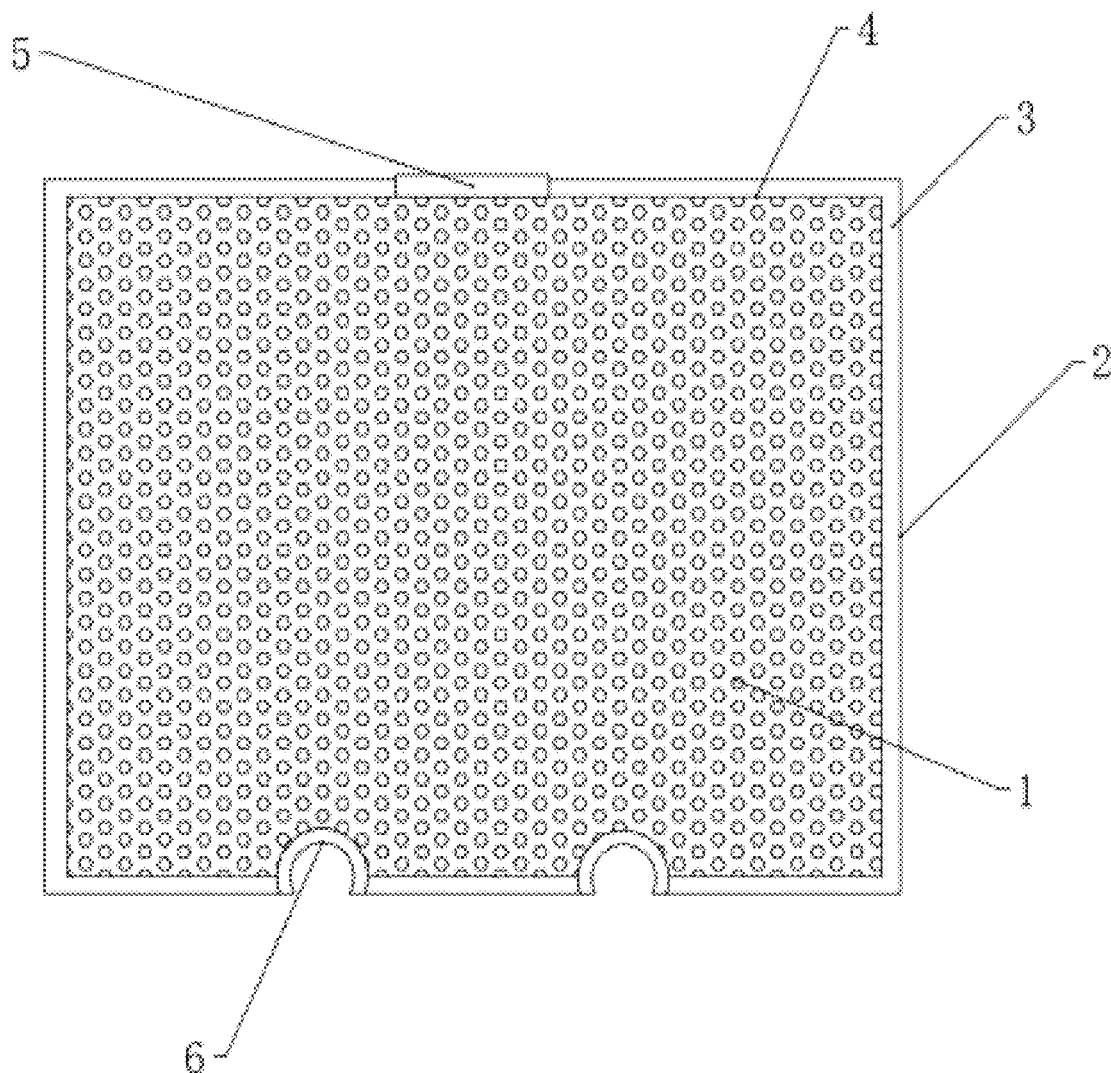
FIG. 1 shows a schematic diagram of a sectional structure of a generation system according to the present disclosure.

Reference numerals and denotations thereof: 1—mixed filler, 2—mold, 3—water-permeable and anti-filtered geotextile, 4—PES hot melt adhesive mesh film, 5—seam, and 6—semicircular bump.

DETAILED DESCRIPTION

The present disclosure is further described by reference to the accompanying drawings and examples below.

Referring to FIGS. 1-5, the present disclosure provides a technical solution applied to a microorganism generation system for a sludge-free aerobic tank and a manufacture method therefor. In the present disclosure, through the study of action mechanism between microorganisms and immobilized materials, a new type of immobilized material and a new type of immobilized process are developed; and by physical and chemical means, the advantageous microorganisms are retained in the area to be determined, ensuring that the microorganisms are not easily lost after being immobilized, increasing the bacterial density of microorganisms, and thus effectively improving the efficiency of nitrogen and phosphorus removal and COD reduction in aerobic tanks for sewage treatment.

Example 1: this example provides a microorganism generation system for a sludge-free aerobic tank, as shown in FIGS. 1-5, including a square mold 2 (other structures can also be used), which is transparent, and scale lines are arranged around an inner wall of the mold for real-time monitoring of the filling condition of mixed fillers; and a water-permeable and anti-filtered geotextile 3, mixed fillers 1, a bonding module and a PES hot melt adhesive mesh film 4 are further included.

The water-permeable and anti-filtered geotextile is fixed to the inner wall of the mold in a matching manner, for wrapping the outside of the generation system, and serves for ventilation, drainage, heat preservation and protection. The water-permeable and anti-filtered geotextile has a lap width of not less than 0.2 m, a thickness of 5-6 mm, and a tensile strength of more than 15 kN/m. The water-permeable and anti-filtered geotextile is fixed and bonded to the PES hot melt adhesive mesh film, and is disposed with a seam 5 on the top. The other side of the PES hot melt adhesive mesh film is fixed and bonded to the mixed fillers.

The mixed fillers 1 are loaded into an inner cavity of the mold in layers through the seam 5 at the top of the water-permeable and anti-filtered geotextile, and the bonding module serves to bond the water-permeable and anti-filtered geotextile to the mixed fillers. The mixed fillers used in this example are a mixture of immobilized carrier containing high density of nitrifying bacteria communities and zeolite in a mass ratio of 1:600-1000, the zeolite being granular zeolite with a diameter of 6-10 mm. The mixed fillers of the carrier microorganisms and the zeolite have a loading density of not less than 2.0 g/cm$^3$ and a void ratio of not less than 35%. The mixed fillers are used for purifying the water by filling them to an inner side of the water-permeable and anti-filtered geotextile.

Figure 2:
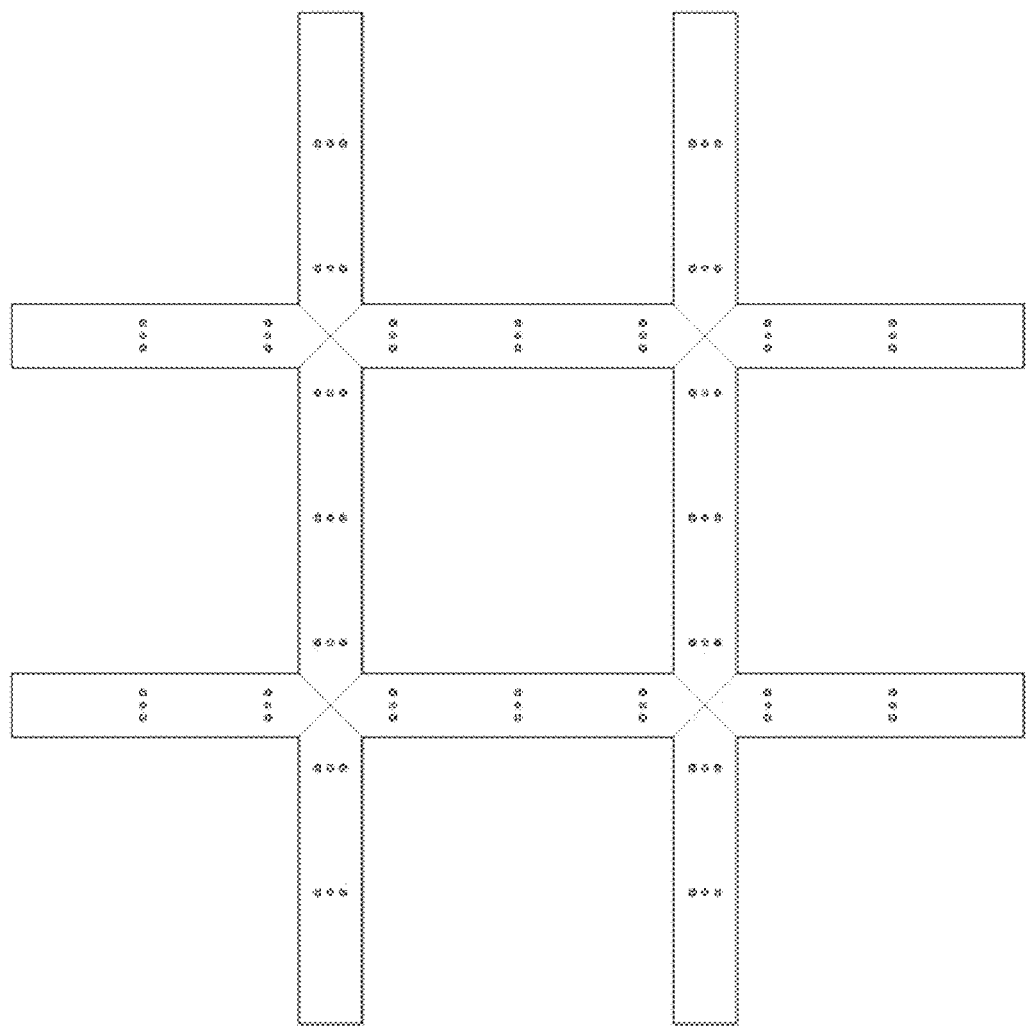
FIG. 2 shows a schematic structural diagram of a semicircular vent pipe from a top view according to the present disclosure.
Figure 3:
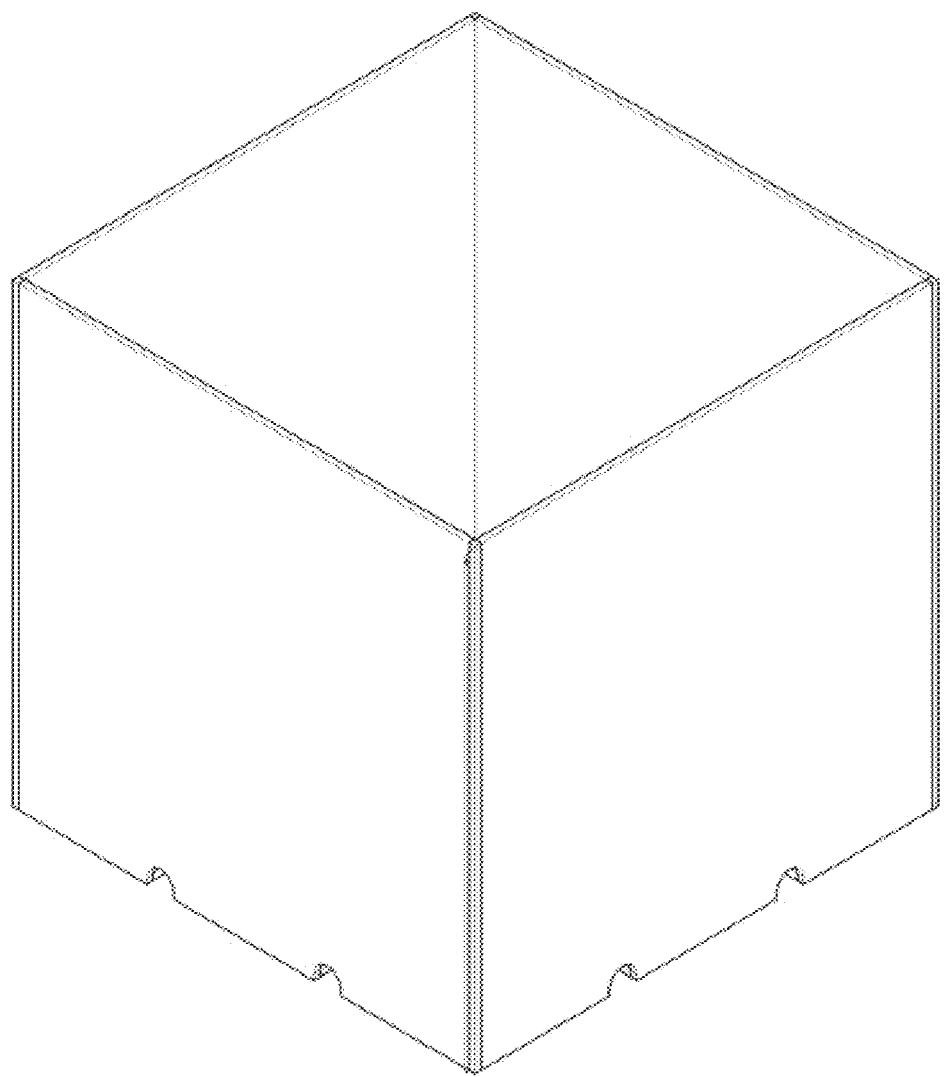
FIG. 3 shows a schematic diagram of a three-dimensional structure of a mold according to the present disclosure.
Figure 4:
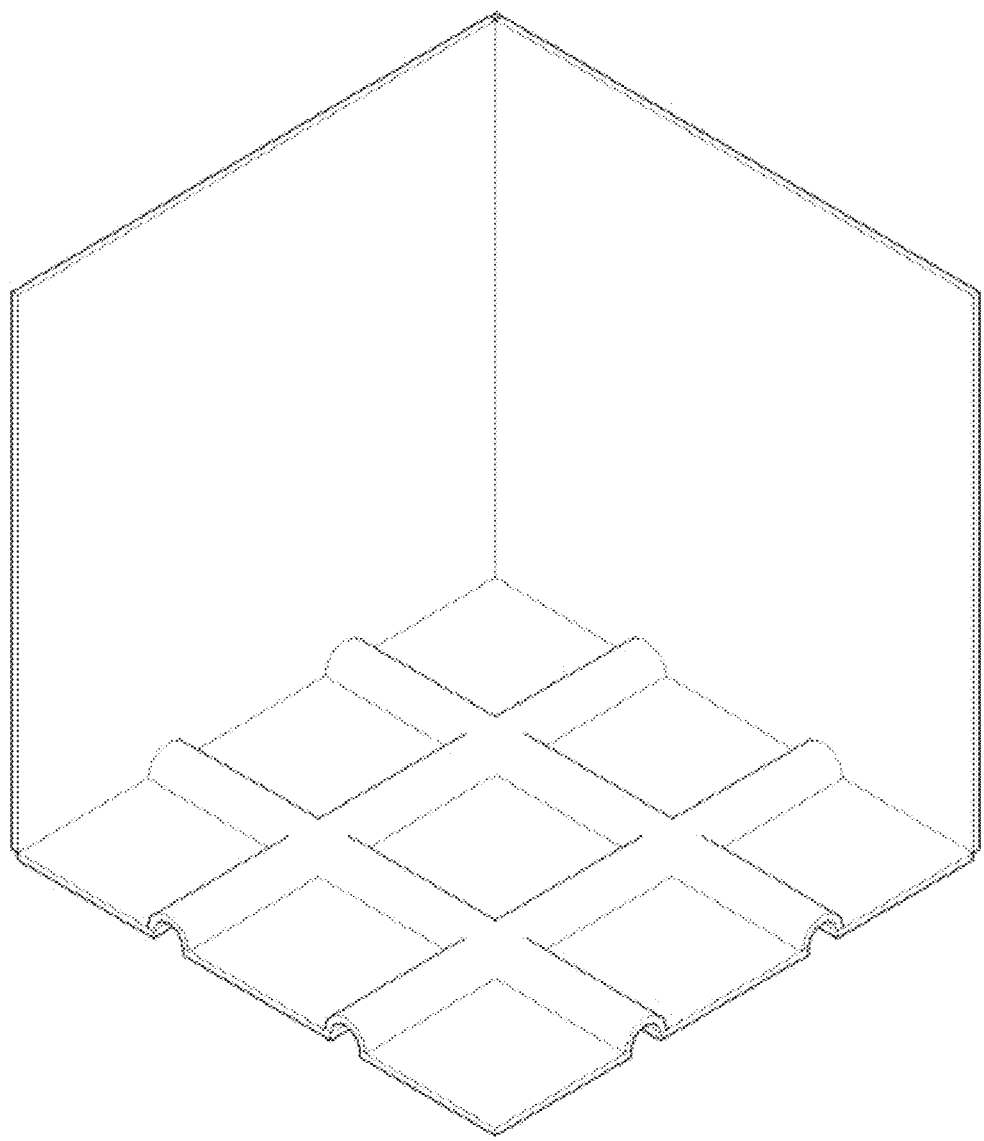
FIG. 4 shows a schematic diagram of an internal semi-sectional structure of the mold according to the present disclosure.
Figure 5:
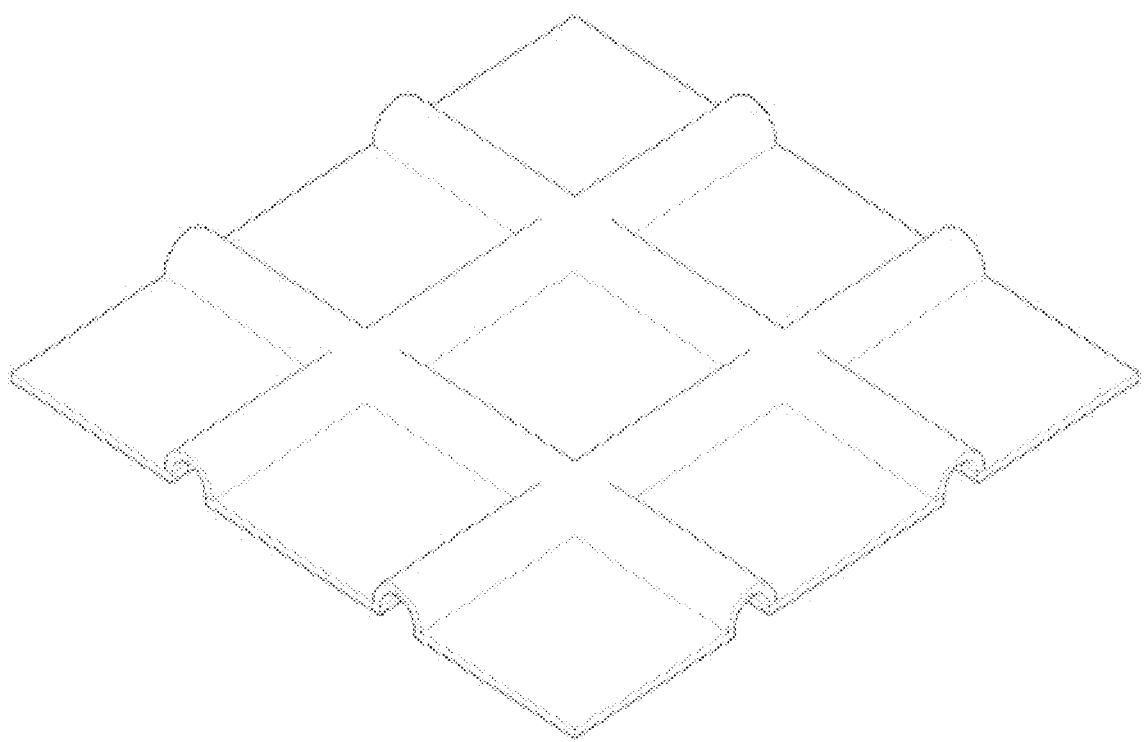
FIG. 5 shows a schematic structural diagram of a bottom plate of the mold according to the present disclosure.

Semicircular bumped structures 6 are arranged in intersecting parallels at a bottom of the mold, and inner cavities of the semicircular bumped structures face outward. The bumped inner cavities at the bottom of the mold serve to sleeve with semicircular vent pipes in a matching manner, and the structure of the vent pipe is shown in FIG. 2. A plurality of groups of vent holes are disposed at equal intervals on the semicircular vent pipes, for providing aeration on the one hand, and strengthening the bottom support assisting in the water-permeable and anti-filtered geotextile on the other hand.

According to the microorganism generation system for a sludge-free aerobic tank provided by the present disclosure, the immobilized carriers containing nitrifying bacteria communities are mixed with the filter material of zeolite, and the water-permeable and anti-filtered geotextile is bonded to the PES hot melt adhesive mesh film to form a whole, which is simple in process, and time-saving and energy-saving. The microorganisms can be automatically generated in the event of sewage and aeration, requiring neither activated sludge nor supplementation of carbon sources, which is in line with the energy-saving environmental protection standards. The deficiencies that in the conventional activated sludge process, the aerobic tanks cover a large area, and have a high operating cost, poor shock-resistant load capacity, a large sludge volume, and the need to add with carbon sources are eliminated, with a better effect of sewage treatment and a high effluent standard.

The present disclosure further provides a manufacture method for a microorganism generation system for a sludge-free aerobic tank, including the following specific steps.

S1, immobilized carriers containing high density of nitrifying bacteria communities, zeolite, a PES hot melt adhesive mesh film and a water-permeable and anti-filtered geotextile are prepared, which are qualified products. The parent strains of nitrifying bacteria communities contained in the immobilized carriers are not less than 108 cfu, which are the core materials of the microorganism generation system, with 2-3/g, and serve to ceaselessly release nitrifying bacteria communities under the conditions of appropriate concentration of sewage, dissolved oxygen and temperature. The zeolite is granular zeolite with a diameter of 6-10 mm, acting as a filler in the microorganism generation system to assist the carrier to purify water. The water-permeable and anti-filtered geotextile has a thickness of 5 mm and a tensile strength of more than 15 kN/m, and serves for ventilation, drainage, heat preservation, protection, etc. The PES hot melt adhesive mesh film has a double-sided adhesive liner, can be roasted for hot melting, with a melting point of 105° C.-115° C., at a roasting temperature of less than 160° C. for a melting time of 12 s or less, and in the microorganism generation system, it serves for bonding the geotextile to the fillers, and can maintain a good adhesive effect in water.

S2, a special mold and special semicircular vent pipes are manufactured as follows.

(1) The special mold is made of steel, and the internal volume is determined according to the scale of sewage that can be treated by the microorganism generation system, as shown in the table below. In this example, taking a microorganism generation system that can treat 10 t of sewage as an example, generally designed in square with a volume of about 0.5 m$^3$ and a size of 810 mm×810 mm×810 mm, with 10 mm being considered as the influence of the geotextile thickness. Scale lines are arranged around and inside the mold at an equal interval of 20 cm, and 2×2 semicircular bumps with a diameter of 40 mm are arranged in the middle of a bottom of the mold.

| Serial number | Suitable water treatment scale/t | Internal volume/m$^3$ | Mold specification (taking square as an example, side length in mm) | Carrier/kg | Notes |
| --- | --- | --- | --- | --- | --- |
| 1 | 1 | 0.06-0.07 | About 400 + 10 | 0.12-0.23 | Small value for rural sewage and large value for urban sewage |
| 2 | 5 | 0.25-0.3 | About 650 + 10 | 0.5-1 | Small value for rural sewage and large value for urban sewage |
| 3 | 10 | About 0.5 | About 8000 + 10 | 1-1.7 | If the sewage treatment scale exceeds 50 t, the sewage is configured in 10 t a group |

(2) Special semicircular vent pipes can be made of semicircular steel pipes with 30 mm of internal diameter and 10 mm of thickness, and a row of vent holes are disposed at the semicircular part every 10 cm, with 3 vent holes disposed at equal intervals in each row. The semicircular vent pipes are sleeved at the bottom of the mold in a matching manner to provide aeration for the microorganism generation system and to assist the geotextile to strengthen the bottom support of the mold.

S3, the immobilized carrier microorganisms are uniformly mixed with the granular zeolite in a mass ratio of 1:600-1000. It is to be noted that the specific value depends on the source of sewage and pollutant concentration, and the sewage volume is designed according to the above table or determined by a test, and the domestic sewage is typically designed by 1:1000.

The water-permeable and anti-filtered geotextile, after being attached to the PES hot melt adhesive mesh film, is fixed to an inner wall of the mold. The PES hot melt adhesive mesh film faces outward for bonding and fixing to the mixed fillers.

S4, the mixed fillers of carriers and zeolite are loaded into the mold in layers, with a filling material generally up 20 cm or so, and a vibration table is used to vibrate while filling, to ensure that the filling is dense; and the upper part is leveled after the filling, and the physical indexes are measured until they meet the requirements.

The physical indexes here mainly include a loading density and a void ratio, and the loading density is required to be not less than 2.0 g/cm$^3$, and the void ratio to be not less than 35%.

S5, after the above indexes meet the requirements, the geotextile at the upper part of the mold is seamed tightly, and it is to be noted that the point seam is not permitted and a lap width is not less than 0.2 m.

S6, the above mold densely filled with the mixed fillers is placed into a drying oven, and a temperature of the drying oven is adjusted to 120° C.-160° C., and the mold filled with mixed fillers is taken out immediately for cooling after being coasted for 8-12 s. The roasting time depends on the complete melting of the PES hot melt adhesive mesh film, but is not to be too long, so as not to affect the activity of the immobilized carrier microorganisms; and after the mold is cooled to room temperature, it is removed to obtain a microorganism generation system.

Test Example 1: to verify the feasibility of the microorganism generation system for a sludge-free aerobic tank and sewage treatment effect in the present disclosure, a new type of integrated agricultural sewage treatment device is developed for the characteristics of rural sewage on the basis of the generation system of the present disclosure, and is practically applied in a village of Xinxiang City, and the operation results show that the device has the following advantages. First, the effluent water quality is high in standard. The three indexes of COD, ammonia nitrogen and total phosphorus are stably better than those of the standard for class IV surface water, and the tail water produced by the treatment can be reused for farm irrigation, greening, toilet flushing, etc., so as to achieve the purpose of reuse of recycled water. Second, the cost on construction and operation and maintenance is low. The construction cost is less than 6000 yuan per ton of water, and the operation and maintenance cost is less than 0.6 yuan per ton of water; organic sludge is produced in trace quantities, saving sludge treatment cost; and carbon sources are not required to be added and the key operation can be automated. Third, the shock-resistant load capacity is strong. The external shocks such as large changes in the quality of influent water, fluctuations in the quantity of influent water, and intermittent starting and stopping can be effectively resisted, and the device is especially suitable for rural domestic sewage which has scattered discharge periods, small water volume and strong seasonality. Fourth, a small area is occupied, saving valuable land resources, and the operation process is noiseless and odorless without affecting the normal life of the surrounding villagers. The device has a remarkable effect, providing a new idea for the treatment of rural sewage.

Test Example 2: to further verify the removal effect of the generation system of the present disclosure on COD, NH$_3$—N and TP, a new type of integrated agricultural sewage treatment device is developed for the characteristics of rural sewage on the basis of the generation system of the present disclosure, and is practically applied in a village of Xinxiang City, with the following results.

1. The Removal Effect on COD During the Operation of the New Integrated Device

The COD concentration of influent water fluctuates from 58.69 to 176.40 mg/L, with an average concentration of 106.39 mg/L. The COD concentration of effluent water in the normal operation stage is from 8.75 to 18.80 mg/L, with an average concentration of 15.50 mg/L, and the average removal rate of COD is 85.43%. The index of COD in the effluent water is stably better than that of the standard for class III water in the environmental quality standard for surface water (GB3838-2002).

2. The Removal Effect on NH$_3$—N During the Operation of the New Integrated Device The concentration of NH$_3$—N in influent water fluctuates from 9.84 to 36.00 mg/L, with an average concentration of 20.30 mg/L. The concentration of NH$_3$—N in effluent water in the normal operation stage fluctuates from 0.03 to 0.93 mg/L, with an average concentration of 0.23 mg/L, and the average removal rate of NH$_3$—N is 98.87%. The index of NH$_3$—N in the effluent water is stably better than that of the standard for class III water in the environmental quality standard for surface water (GB3838-2002).

3. The Removal Effect on TP During the Operation of the New Integrated Device

The concentration of TP in influent water fluctuates from 0.57 to 2.27 mg/L, with an average concentration of 1.06 mg/L. The concentration of TP in effluent water in normal operation is from 0.01 to 0.18 mg/L, with an average concentration of 0.06 mg/L, and the average removal rate of TP is 94.34%. The index of TP in effluent water is stably better than that of the standard for class III water in the environmental quality standard for surface water (GB3838-2002).

In summary, the generation system of the present disclosure can effectively remove COD, NH$_3$—N and TP from water, with a higher removal rate, allowing the above indexes of the decontaminated water are stably better than those of the standard for class III water in the environmental quality standards for surface water (GB3838-2002).

Test Example 3: the microorganism generation system is tested in this test example by the following specific process.

(1) Semicircular vent pipes are mounted in grooves at a bottom of the microorganism generation system, and the system is placed in a test box, which is inflated with a blower and the airflow is observed.

(2) After meeting the requirements of aeration in step (1), samples are taken in a proportion of 3% of the finished products in a batch of the microorganism generation system (at least 1 sample), the microorganism generation system is placed in a container stored with simulated sewage, in which, an aeration apparatus is also placed to control the dissolved oxygen of the water to be 1.5 mg/L-4 mg/L.

(3) Aeration is performed for 4 d and the concentration of microorganisms in the water is tested. The concentration of microorganisms in the water of not less than 1011 cfu/g is considered to be qualified.

The airflow in step (2) mostly overflows from the microorganism generation system.

The ammonia-nitrogen concentration of the simulated sewage in step (3) is controlled at 100 mg/L-150 mg/L, and the phosphorus concentration is controlled to be lower than 0.5-1 mg/L.

The above described are merely the preferred examples of the present disclosure, not used for limiting the present disclosure. Any modifications, equivalent replacements and improvements made within the spirit and principles of the present disclosure are included in the scope of protection of the present disclosure.

The invention claimed is:

1. A microorganism generation system for a sludge-free aerobic tank, comprising a square mold, the square mold being transparent, and further comprising a water-permeable and anti-filtered geotextile, a bonding module and mixed fillers, wherein the water-permeable and anti-filtered geotextile is fixed to an inner wall of the mold in a matching manner, and bonded and fixed to the bonding module; the mixed fillers are loaded into an inner cavity of the square mold in layers through a seam at a top of the water-permeable and anti-filtered geotextile; the bonding module serves to bond the water-permeable and anti-filtered geotextile to the mixed fillers; semicircular humps are arranged at a bottom of the square mold in intersecting parallels, and semicircular vent pipes for providing aeration are sleeved in a matching manner inside inner cavities of the semicircular humps arranged in intersecting parallels; the bonding module is a polyethersulfone (PES) hot melt adhesive mesh film; scale lines are arranged around the inner wall of the square mold; vent holes are disposed at equal intervals on the vent pipes; the mixed fillers comprise carrier microorganisms and zeolite, the zeolite being granular zeolite with a diameter of 6-10 mm, and the two are mixed in a mass ratio of 1:600-1000; and the mixed fillers of the carrier microorganisms and the zeolite have a loading density of not less than 2.0 g/cm$^3$ and a void ratio of not less than 35%, for the treatment of sewage into rivers and lakes or the bypass treatment of polluted water in rivers and lakes and the restoration of water ecology.

2. The microorganism generation system for a sludge-free aerobic tank according to claim 1, wherein the carrier microorganisms are immobilized carriers containing nitrifying bacteria communities.

3. The microorganism generation system for a sludge-free aerobic tank according to claim 1, wherein the water-permeable and anti-filtered geotextile has a lap width of not less than 0.2 m, a thickness of 5-6 mm, and a tensile strength of more than 15 kN/m.

4. A manufacture method for a microorganism generation system for a sludge-free aerobic tank, comprising the following steps: S1, material preparation: providing immobilized carriers containing density of nitrifying bacteria communities, zeolite, a polyethersulfone (PES) hot melt adhesive mesh film, and a water-permeable and anti-filtered geotextile; S2, manufacturing a mold and semicircular vent pipes, and sleeving the vent pipes to bumped cavities arranged in intersecting parallels at a bottom of the mold in a matching manner; and uniformly mixing immobilized carrier microorganisms and granular zeolite in proportion; S3, fixing the water-permeable and anti-filtered geotextile, after being attached to the PES hot melt adhesive mesh film, to an inner wall of the mold; S4, loading a mixed fillers into the mold in layers while vibrating with a vibration table, to ensure that the filling is dense, leveling an upper part after the mold is filled with the mixed fillers, and seaming tightly the water-permeable and anti-filtered geotextile on the upper part; and S5, placing the mold filled with the mixed fillers into a drying oven for roasting before being cooled to room temperature, obtain athe microorganism generation system for a sludge-free aerobic tank, removing the mold;

wherein the microorganism generation system for a sludge-free aerobic tank, comprises the mold, wherein the mold is a square mold, the square mold being transparent, and further comprises the water-permeable and anti-filtered geotextile, a bonding module and the mixed fillers, wherein the water- permeable and anti-filtered geotextile is fixed to the inner wall of the square mold in the matching manner, and bonded and fixed to the bonding module;

the mixed fillers are loaded into an inner cavity of the mold in layers through a seam at a top of the water-permeable and anti-filtered geotextile; the bonding module serves to bond the water-permeable and anti-filtered geotextile to the mixed fillers; semicircular humps are arranged at the bottom of the square mold in intersecting parallels, and semicircular vent pipes for providing aeration are sleeved in a matching manner inside inner cavities of the semicircular humps arranged in intersecting parallels; the bonding module is a PES hot melt adhesive mesh film; scale lines are arranged around the inner wall of the square mold; vent holes are disposed at equal intervals on the vent pipes; the mixed fillers comprise carrier microorganisms and zeolite, the zeolite being granular zeolite with a diameter of 6-10 mm, and the carrier microorganisms and the zeolite are mixed in a mass ratio of 1:600-1000; and the mixed fillers of the carrier microorganisms and the zeolite have a loading density of not less than 2.0 g/cm$^3$ and a void ratio of not less than 35%, for the treatment of sewage into rivers and lakes or the bypass treatment of polluted water in rivers and lakes and the restoration of water ecology.

5. The manufacture method for a microorganism generation system for a sludge-free aerobic tank according to claim 4, wherein in step S5, when a temperature of the drying oven is increased to 120° C.-160° C., the mold is immediately taken out for cooling after being roasted for 8-12 s.

6. The manufacture method for a microorganism generation system for a sludge-free aerobic tank according to claim 4, wherein in step S5, when a temperature of the drying oven is increased to 120° C.-160° C., the mold is immediately taken out for cooling after being roasted for 8-12 s.

7. The manufacture method for a microorganism generation system for a sludge-free aerobic tank according to claim 4, wherein in step S5, when a temperature of the drying oven is increased to 120° C.-160° C., the mold is immediately taken out for cooling after being roasted for 8-12 s.

* * * * *